UNITED STATES PATENT OFFICE.

SERENO E. NORTON, OF THORSBY, ALABAMA, ASSIGNOR TO CARLE C. CONWAY, OF NEW YORK, N. Y.

ART OF PREPARING NUTS FOR FOOD.

1,063,208.  Specification of Letters Patent.  Patented June 3, 1913.

No Drawing.  Application filed June 24, 1912. Serial No. 705,447.

*To all whom it may concern:*

Be it known that I, SERENO E. NORTON, a citizen of the United States, residing in Thorsby, in the county of Chilton and State of Alabama, have invented a new and useful Improvement in the Art of Preparing Nuts for Food, of which the following is a specification.

This invention relates to an improvement in the art of preparing nuts for food, and it consists in the process hereinafter more fully set forth and the product thereof, and made the subject matter of claim.

By experiment I have discovered, and herein lies my invention, that if nut meats, such as the meats of peanuts, are immersed for a short time in oil heated to a high degree, for example, 300 degrees Fahrenheit, the result is that the nut kernels become crisp and tender, easily reduced to a powder by mastication, and somewhat swelled or enlarged in size, and at the same time very much improved in flavor and digestibility. The flavor of the nut meats thus prepared is very different from that of the ordinary cooked nuts, and the consistency or character of the nut meats also quite different, being tender where the ordinary cooked nut meats are tough. I employ oil or fat which does not become rancid in hot weather, which does not thicken, nor scorch at high temperature, and which will not take on any taste from the material cooking therein. I prefer to use vegetable oil or fat, known in the market as Crisco, and which will readily stand for a considerable time, a temperature above 400 degrees Fahrenheit, and in practice I prefer to raise this oil to a temperature of 400 to 450 degrees Fahrenheit and immerse the nut meats from a minute and a quarter to a minute, the higher the temperature, the less the time of immersion required to effect the result. Crisco, I am informed, is made out of peanut oil by a secret treatment that I do not know. But ordinary peanut oil will stand the proper high temperature and will answer the purpose quite as well as Crisco and may be used instead thereof. This high temperature operates to sear the outer surface of the nut meat, which seems to retain the flavor. The hot oil does not penetrate the nut meat, nor give any of its own flavor thereto. The effect of the highly heated oil and the sudden immersion of the nut meats therein is not only to cook, but in a measure to disintegrate and partly pop or expand the entire structure of the nut, making it easily pulverizable and quite changing the flavor thereof.

The product is entirely different in flavor and constitution or characteristics from any cooked nut meats that I know of, and for this reason, I have given it the trade name of "Popnut" to distinguish it from the ordinary cooked or baked nuts. After the nut meats have thus been expanded or partly popped by this sudden immersion into the highly heated oil, they may be salted or sweetened as desired, or eaten plain.

I claim:—

1. The herein described process of treating nut meats which consists in immersing the raw meats for a brief period of time not exceeding two minutes in a highly heated fatty medium, at a temperature not below 300 degrees Fahrenheit.

2. The herein described process of treating nut meats which consists in immersing the raw meats for the brief period of one minute and a quarter to one minute in a highly heated fatty medium, at a temperature of 400 to 450 degrees Fahrenheit.

3. The product, consisting of nut meats partly popped in a highly heated oil.

SERENO E. NORTON.

Witnesses:
GUY H. GERALD,
J. M. LANGSTON.